United States Patent [19]

Kim et al.

[11] Patent Number: 4,710,935
[45] Date of Patent: Dec. 1, 1987

[54] PARITY DETECTION SYSTEM FOR WIDE BUS CIRCUITRY

[75] Inventors: Dongsung R. Kim, Laguna Hills; Reinhard K. Kronies, Fountain Valley, both of Calif.

[73] Assignee: Unisys Corporation (formerly Burroughs Corporation), Detroit, Mich.

[21] Appl. No.: 848,073

[22] Filed: Apr. 4, 1986

[51] Int. Cl.[4] .............................................. G06F 11/10
[52] U.S. Cl. ........................................ 371/49; 371/68
[58] Field of Search ....................... 371/24, 49, 51, 67, 371/68, 71; 364/200 MS File, 900 MS File, 738, 786; 365/201

[56] References Cited

U.S. PATENT DOCUMENTS 3,882,460  5/1975  Bennett ................................... 371/49
4,245,344  1/1981  Richter ............................. 371/49 X
4,360,917  11/1982  Sindelar ................................. 371/49

OTHER PUBLICATIONS

F. F. Sellers, "Error Detecting Logic for Digital Computers", 1968, pp. 208 and 210.
C. H. Schuenemann, "Correction of Single Errors by Double Parity Check", IBM TDB, vol. 13, No. 5, 10/1970, pp. 1324-1325.

*Primary Examiner*—Jerry Smith
*Assistant Examiner*—Robert W. Beausoliel, Jr.
*Attorney, Agent, or Firm*—Alfred W. Kozak; Nathan Cass; L. Joseph Marhoefer

[57] ABSTRACT

A parity checking system for establishing integrity of data transfer on a wide bus. Each set of "4" bus lines of a multiple line bus is passed from a driver chip to a corresponding receiver chip. An added parity driver chip senses each corresponding bit line of each driver chip to develop a set of four parity signals for comparison with corresponding parity signals from each corresponding bit line of each one of a set of receiver chips. Any discrepancy will generate a parity error signal.

12 Claims, 2 Drawing Figures

| FIG.1A. | FIG.1B. |

PARITY DETECTION SYSTEM FOR WIDE BUS CIRCUITRY

FIELD OF THE INVENTION

This disclosure relates to systems for data transfer integrity over a wide bus by use of specialized parity check circuitry.

CROSS REFERENCES TO RELATED APPLICATIONS:

This disclosure is related to a patent application by inventors Dongsung R. Kim and Reinhard K. Kronies filed April 21, 1986 as U.S. Ser. No. 854,232, and entitled "Specialized Parity Detection Scheme for Wide Memory Structure".

BACKGROUND OF THE INVENTION

While data can be transmitted on a single line in a serial fashion, it is much more efficient, rapid and useful to transfer data bits on parallel lines which constitute a bus. Thus, a bus which can provide parallel transfer of four or more bits simultaneously can be considered a wide bus.

Of course, the wider the bus the more data bits can be simultaneously transferred in parallel, thus saving many time units in the transfer of significant data.

Generally, the conventional parity check schemes which are used with wide data bus communications are accomplished by the single bit parity generation scheme, whereby a single bit of parity is generated at the driver-end of the bus and whereby the receiver-end of the bus is used to check the parity bit in order to establish the occurrence of a normal transmission or an error-incurred transmission.

In the single bit parity generation scheme, this system is relatively useful if each driver unit and each receiver unit are "single-bit oriented".

However, in modern circuitry applications, in order to reduce the cost of elements, it is general standard use that most of the driver chips and receiver chips are designed as "multiple" driver units and "multiple" receiver units into a single package.

The single bit parity generation-detection scheme has a certain liability in that it fails to detect many cases of common failures when an entire chip has failed. In these cases of whole chip failure, the situation occurs where all of the drivers and all of the receivers in the particular package are inoperative or have failed. As a result of this, the final result will show anywhere between no error occurring to showing the complete failure of all "k" bits, where "k" is a number of drivers or the number of receivers in the particular chip.

Additionally, the symbol "n" will represent the number of lines constituting the entire wide bus.

SUMMARY OF THE INVENTION

The present disclosure works to obviate the limitations occurring when parity detection is oriented on a single bit basis. The present system operates to generate separate parity bits for each bit position of each driver circuit on each of the driver chips by its positions. This results in having "k" parity bits which are equal to the number of drivers in the particular chip.

In the bus system this means that there is added another parity driver chip into the system, rather than adding in a single parity bit driver circuit. Thus, the system is architecturally arranged so that, for example, the parity bit 0 would be the "parity sum" of the bit position "0's" of each of the driver chips involved. And thus the parity bit "k" would be the "parity sum" of the bit position "k's" of each one of the bus driver chips.

Then additionally, the bus receiver chips at the receiving end of the bus are arranged to have the same number of receiver circuits as the number of driver circuits in the driver chips. Thus, when the data bits are received, the parity detection scheme operates to collect the separate parity sum for each receiver circuit (by bit position) of each of the receiver chips and including an added parity receiver chip. This accomplishes parity comparison and error detection for each bit position of each group. Then, by using an "OR" gate system sensitive to all of these "k" parity check lines, it is possible to arrange the resulting parity check to be accomplished in a fashion such that any single driver or receiver chip failure that occurs will be detected by this system for all types of situations.

DESCRIPTION OF A PREFERRED EMBODIMENT

Figures 1, 1A:
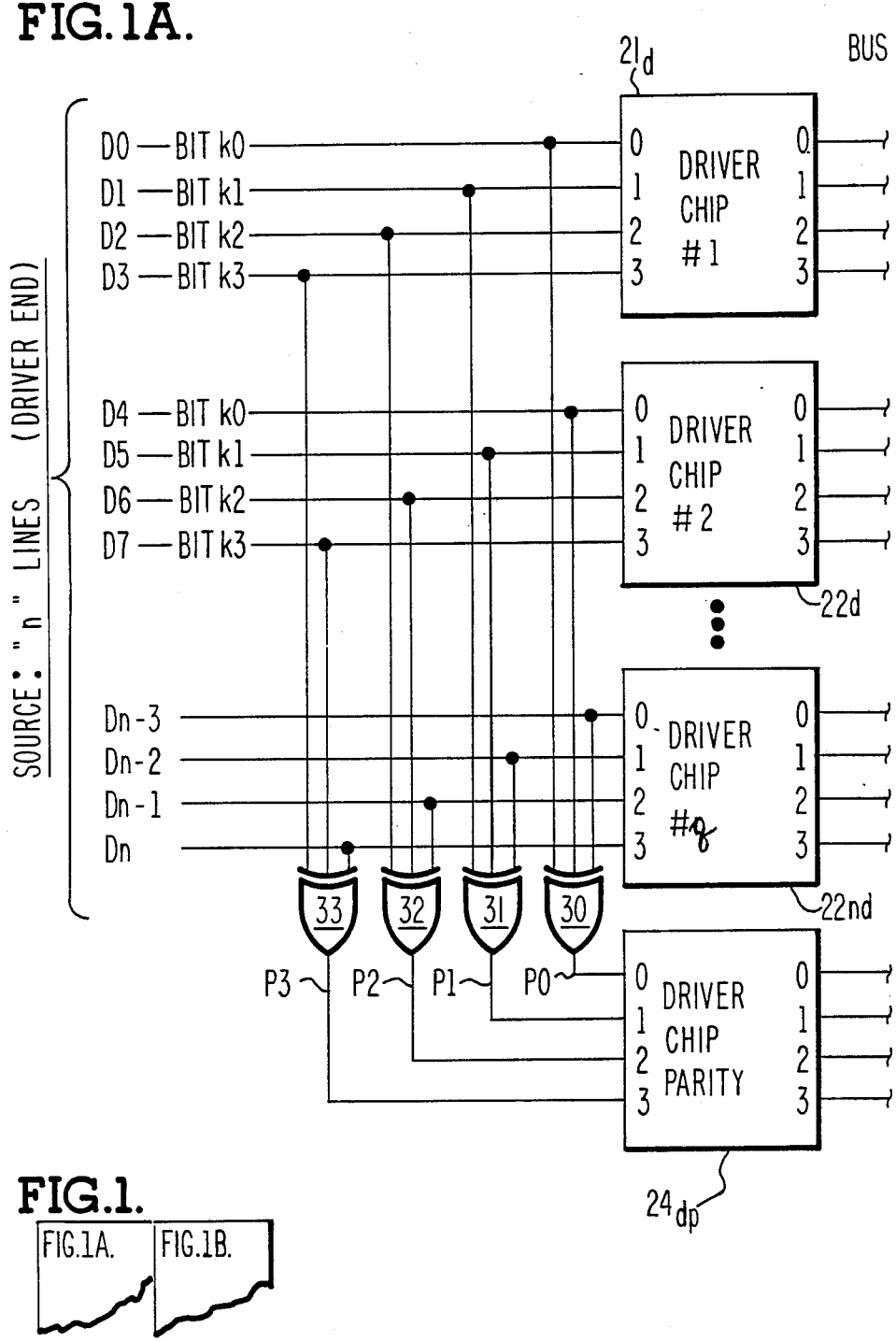
FIG. 1, which is comprised of FIGS. 1A and 1B, is a drawing of a wide bus composed of "n" multiple lines, whereby a series of multiple driver chips are used to transmit data bits to a series of multiple receiver chips and whereby one set of additional driver and receiver chips is used for parity sensing operations.
Figure 1B:
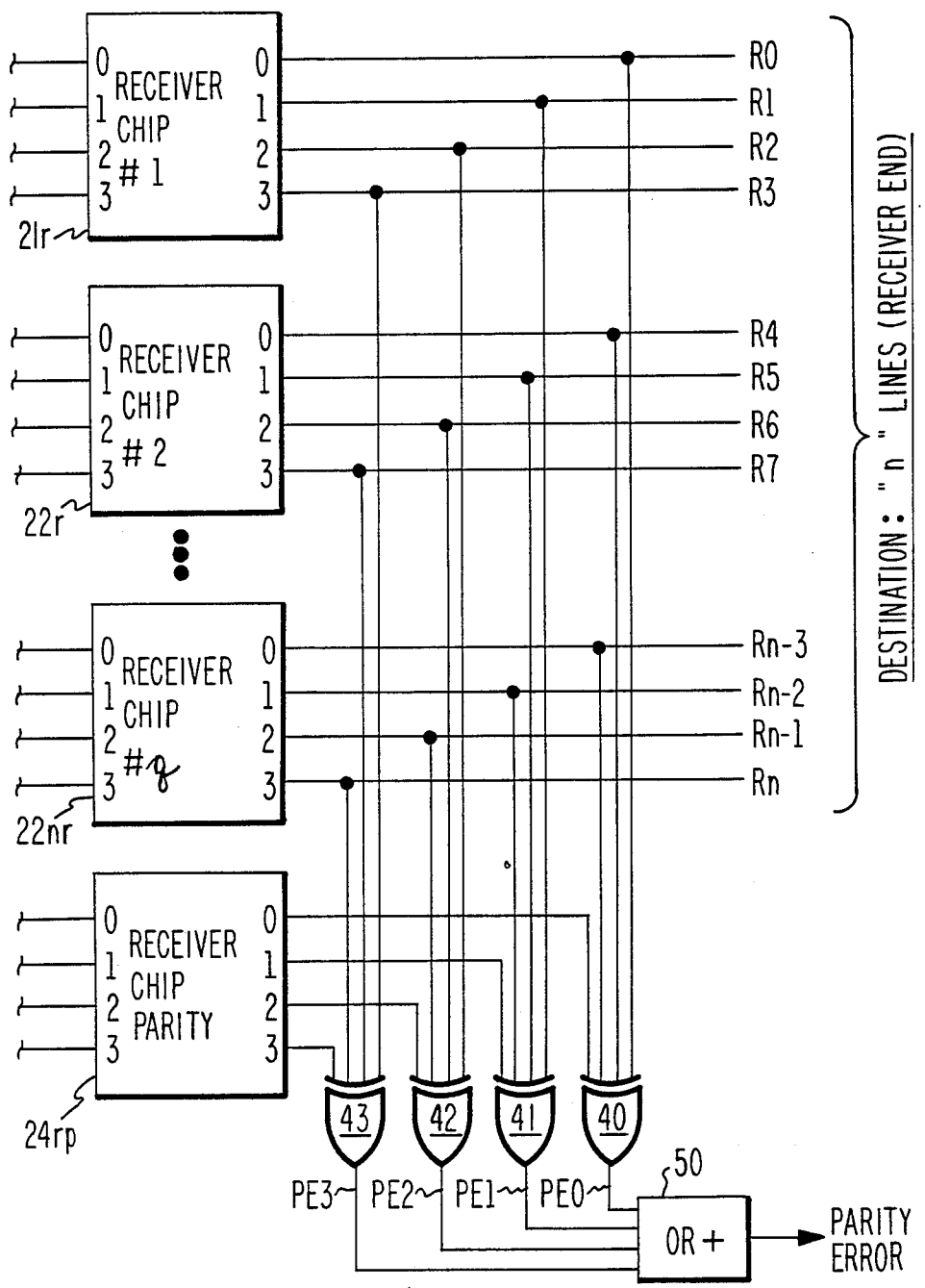

Referring to FIG. 1 there is shown a wide bus system composed of individual source of "n" transmitting lines, each of which is labelled as $D_0$, $D_1$, $D_2 \ldots D_7 \ldots D_{n-3}$, $D_{n-2}$, $D_{n-1}$, and $D_n$. These represent any number of lines which may be designated by the letter "n".

As can be seen from FIG. 1, these lines of the bus connect to individual groups of driver chips, whereby lines $D_0$ through $D_3$ connect to the first driver chip $21_d$, and likewise the lines $D_4$ through $D_7$ connect to the second driver chip $22_d$. Then lines $D_{n-3}$ through $D_n$ connect to the driver chip element $22_{nd}$.

Thus, for example, each driver chip package is seen to have four driver circuits which handle four of the incoming data lines. The "number" of drivers or receivers in a chip will be designated as "k".

Again referring to FIG. 1, it is now seen that each driver circuit of each driver chip connects across the transmitting bus to a corresponding receiver chip so that the first receiver chip $21_r$ will receive four (for example, k=4) incoming lines, the second receiver chip $22_r$ will receive the next four incoming lines, and the receiver chip "n" shown as $22_{nr}$ will receive the last four remaining data lines. Then, of course, the outputs of the series of (Destination) receiver chips $21_r$, $22_r$, and $22_{nr}$ should theoretically provide data bits at the lines $R_0$, $R_1 \ldots R_6$, $R_7 \ldots R_{n-1}$, $R_n$, which should form a pattern of bits which exactly duplicates the pattern of bits which were coming from the Source lines $D_0 \ldots D_n$.

Now in order to provide for and realize the integrity of this data transmission system, there is provided a series of "Exclusive OR" gates 30, 31, 32, 33 which feed the parity driver chip $24_{dp}$. The driver parity chip $24_{dp}$ feeds its output to the receiver parity chip $24_{rp}$.

The receiver parity chip $24_{rp}$ provides outputs to a series of "Exclusive OR" gates 40, 41, 42, 43 which also receive the outputs of the series of receiver chips $21_r$ through $22_{nr}$.

Each output of the "Exclusive OR" gates 40, 41, 42, 43 provides an input to an OR gate 50, whereby any discrepancy between the bit pattern on the source lines $D_0$ through $D_n$ and the bit pattern on the receipt lines $R_0$ through $R_n$ will be revealed by the existence of a parity error signal which is output from the OR gate 50.

Additionally, this system will also detect any errors occurring in transmission on the parity lines $P_0$, $P_1$, $P_2$, and $P_3$ of FIG. 1.

As will be seen from the elements shown in FIG. 1, this improved parity detection system generates separate parity bits for each driver circuit line ($k_0$, $k_1$, $k_2$, $k_3$) of each one of each of the driver chips. Thus, there is provided "k" parity bits which means that the number of parity bits provided is equal to the number of driver circuits provided by all of the driver chips.

Thus, instead of adding a single parity bit driver circuit to be transmitted to a receiver bit parity circuit, there is added an extra parity driver chip package, which is of comparable size (k inputs) to each of the driver chips $21_d$ through $22_{nd}$.

The result of this system in combination with the Exclusive OR gates 30, 31, 32, 33 is that the parity bit 0, $P_0$ (co-relating to line $D_0$, $D_4$, $D_{n-3}$) is developed to be the parity sum of all of the bit 0's of each one of all of the driver chip units.

Similarly, it is seen that the parity bit "3", on line $P_3$ (comparable to lines $D_3$, $D_7$, $D_n$) would then be the parity sum of the bit "3's" of each one of all of the driver chips $21_d$, $22_d$ ... $22_{nd}$.

As was seen in FIG. 1, the receiver chips $21_r$ through $22_{nr}$ are seen to have the same number of receiver circuits as there are number of driver circuits in the driver chips. When the data bits are received by the receiver chips, the present system operates to collect the separate parity bit for each individual receiver circuit from each of the receiver chips including the parity receiver chip $24_{rp}$, which bits are then compared in Exclusive OR gates 40, 41, 42 and 43.

The Exlusive OR gates 40, 41, 42, 43 operate to sense each set of bit lines ($k_0$, $k_1$, $k_2$, $k_3$) of each receiver chip and to correlate each set of bit lines with the received bits from lines $P_0$, $P_1$, $P_2$ and $P_3$.

If any discrepancy occurs on the inputs of Exclusive OR gates 40, 41, 42, 43, then a parity error signal will appear on the appropriate line as $PE_0$, $PE_1$, $PE_2$ or $PE_3$.

When the pattern of digital bits at the output of the receiver chips ($21_r$ through $22_{nr}$) is a perfect duplicate of the pattern at the Source level of $D_0$ through $D_n$, and also the parity bits on lines $P_0$, $P_1$, $P_2$, $P_3$ (driver side) match the parity bits on the receiver side at input to gates 40 through 43, then each output line of EX-OR gates 40–43 will be "low" so that no activation of OR gate 50 will occur and gate 50 will show "no-output".

However, should any driver chip or any receiver chip fail, there will result five possibilities:
(i) no error because this failure has not changed the data involved; for example, all the Source "0's" are still "0's" at the Destination end;
(ii) single bit-error;
(iii) two bit-errors;
(iv) three bit-errors;
(v) four bit-errors.

In the case of a no-error situation, no detection of error will be indicated by OR gate 50 since the data was transferred correctly.

For all the other cases (ii, iii, iv and v) there will be at least one of gates 40 through 43 which will be activated "high" which cause the output of OR gate 50 to go "high", thus indicating that a transmission error has occurred.

Thus, any single driver chip failure or any receiver chip failure will be detected by this system in all cases.

Costwise the use of this enhanced system over the conventional scheme is very small since it has added only one pair of driver and receiver chips rather than one pair of driver receiver circuits.

It is rare that there is readily available a single driver receiver chip package. Due to cost reasons, these are made in multiple units for multiple drivers and multiple receivers in a single package.

This system can be applied to any kind of a bus scheme and can be extended to use for driving and receiving registers by placing the generation points and detection points just before the driving registers and just after the receiving registers.

There has herein been described an improved and enhanced system for detection of data transmission errors through use of parity sensing means, whereby cost effective means are provided for the detection of transmission errors in each circuit of a series of driver chips and in each circuit of a series of receiver chips. Thus, there is obviated any chance whereby a driver circuit or a receiver circuit failure, including whole chip failure, will go undetected when used in the wide bus system.

Although a particularized preferred embodiment of the invention has been described herein, it should be understood that other variations of the concepts of this system may be provided and are deemed to be encompassed by the following claims.

What is claimed is:

1. A data transfer system for checking reliability of data trasnfers from a Source means to a Destination means and where a transfer bus has "n" data bit lines organized in groups of "k" lines and each group of "k" lines is serviced by a multiple driver chip and a corresponding multiple receiver chip, the system comprising:
(a) said data transfer bus having a n data-bit lines for transferring data from said Source means to said Destination means;
(b) a plurality of "q" driver chips, connected to receive data from said Source means, where $q = n/k$ and wherein k represents a number of data transfer lines in a group where "k" is a submultiple of "n";
(c) a plurality of "q" receiver chips each of which is connected to receive "k" data bit lines from each of a co-related driver chip for subsequent transfer to said Destination means;
(d) first sense means, connected to said Source means; for sensing each of said data bits on each corresponding input line on each of said "q" driver chips to provide a first set of "k" resultant-parity bits to a parity driver chip;
(e) parity chip means including:
(e1) said parity driver chip for receiving said first set of "k" resultant partity bits and transferring them to a parity receiver chip;
(e2) said parity receiver chip connected to transmit said first set of "k" resultant parity bits to a second sense means;
(f) second sense means, connected to said Destination means and receiving said first set of "k" resultant partiy bits, and for sensing each of said data bits on each corresponding output line of said "q" receiver chips to provide a second set of "k" resultant-parity bits which result from compasring said receiver chips output line data bits with said first set of "k" resultant parity bits;

(g) third sense means for receiving said second set of "k" resultant-parity bits to generate an error flag signal when a data transmission error has occurred.

2. The system of claim 1 wherein each group of k data bit lines provides a set of k inputs to each one of said q driver chips.

3. The system of claim 2 wherein each one of said "q" driver chips provides a corresponding set of "k" output lines to "k" inputs of a corresponding "q" receiver chip.

4. The system of claim 1 wherein said first sense means includes:
(a) a set of "k" XOR gates wherein each XOR gate has a series of "k" gate inputs whereby each of said gate inputs is connected to the same corresponding input line on each of said q driver chips.

5. The system of claim 4 wherein said second sense means includes:
(a) a plurality of "k" XOR gates, each of said gates connected to each corresponding output line of each of said receiver chips and wherein each said XOR gate input includes:
(a1) a connection to receive one data bit output from a corresponding output line of said parity receiver chip.

6. The system of claim 1 wherein said second sense means includes:
(a) means to compare each set of the "k" bits of said Destination data bits with each set of said corresponding "k" Source data bits.

7. The system of claim 1 wherein said third sense means includes:
(a) means to generate a partiy error signal upon occurrence of non-duplication between any set of said Destination data bits with the corresponding set of Source data bits.

8. In a data integrity checking system providing a bus means having "n" information data bit lines connecting a Source means to a Destination means, the combination comprising:
(a) said bus means connecting said Source means to $q=n/k$ driver chip means which connect to "q" receiver chip means for data bit transmission to said Destination means;
(b) each of said "q" driver chip means having "k" input and output lines;
(c) each of said "q" receiver chip means having "k" input and output lines;
(d) means for comparing the information data bits on each set of corresponding input lines on each one of said "q" driver chip means to the information data bits on the set of corresponding output lines on each one of said "q" receiver chip means.

9. The combination of claim 8 wherein said means for comparing includes:

(a) means for generating an error signal when the corresponding bits from the said driver chip means do not match the bits from the corresponding receiver chip means.

10. A data transmission system for checking integrity of data transfer comprising:
(a) a bus means having "n" individual lines organized in sets of k lines;
(b) a Source means connected to place information data bits on each line of said n lines;
(c) a plurality of $q=n/k$ driver chip means wherein each driver chip means receives data on a set of "k" input lines and transmits data on "k" output lines to a receiver chip means;
(d) a plurality of "q" receiver chip means wherein each receiver chip means receives data on a set of "k" input lines for transmission to a Destination means;
(e) first means for sensing a first series of data bits, each one of said first series of bits including:
(e1) means for sensing data from each corresponding input line from each one of said q driver chip means;
(f) second means for sensing a second series of bits of data, each one of said second series of bits including:
(f1) means for sensing data bits from each corresponding output line from each one of said q receiver chip means;
(g) means to compare each of the corresponding first and second series of bits for corresponding sets of inputs to said driver chip means with the corresponding bits for corresponding sets of outputs from said receiver chip means.

11. The system of claim 10 which includes:
(h) means to generate a parity error signal when any one compared bit of said first and second series of bits fail to match in value.

12. In a bus transmission integrity apparatus for transmitting data on "n" data bit lines from a Source means to a Destination means, the apparatus comprising:
(a) $q=n/k$ driver-receiver chip means for transmitting information data bits from said Source to said Destination means, each one of said "q" chip means having "k" internal driver-receiver units, wherein each said driver-receiver unit transmits "k" bit lines of Source means data to said Destination means;
(b) means for comparing each one of said "k" bit lines of data on each one of said "q" driver chip means to each one of said "k" bit lines of data on each corresponding line from each one of said "q" receiver chip means.
(c) error flag generating means, connected to said means for comparing, to generate an error signal when a mismatch occurs between said data at said Source means and said data at said Destination means.

* * * * *